(12) United States Patent
Finkler

(10) Patent No.: US 9,013,196 B2
(45) Date of Patent: Apr. 21, 2015

(54) ELECTRIC MACHINE

(75) Inventor: Roland Finkler, Erlangen (DE)

(73) Assignee: Siemens Aktiegesellschaft, München (DE)

( * ) Notice: Subject to any disclaimer, the term of this patent is extended or adjusted under 35 U.S.C. 154(b) by 247 days.

(21) Appl. No.: 13/610,449

(22) Filed: Sep. 11, 2012

(65) Prior Publication Data

US 2013/0241575 A1 Sep. 19, 2013

(30) Foreign Application Priority Data

Sep. 12, 2011 (EP) .................... 11180855

(51) Int. Cl.

| | |
|---|---|
| G01R 27/26 | (2006.01) |
| G01B 7/14 | (2006.01) |
| H02K 11/00 | (2006.01) |
| G01D 5/24 | (2006.01) |
| H02K 41/02 | (2006.01) |

(52) U.S. Cl.
CPC ............. G01B 7/14 (2013.01); H02K 11/0015 (2013.01); G01D 5/24 (2013.01); H02K 41/02 (2013.01)

(58) Field of Classification Search
CPC ... H02K 29/06; H02K 11/0015; H02K 41/02; G01D 5/24; G01B 7/003; G01B 7/14
USPC ..................... 324/658, 750.17, 686; 310/181; 318/135; 340/10.1
See application file for complete search history.

(56) References Cited

U.S. PATENT DOCUMENTS

| | | | |
|---|---|---|---|
| 8,022,587 B2* | 9/2011 | Hoppe ......................... | 310/181 |
| 2007/0290638 A1 | 12/2007 | Chitayat | |
| 2008/0211436 A1* | 9/2008 | Dietz et al. .................... | 318/135 |
| 2011/0221570 A1* | 9/2011 | Finkler et al. ................ | 340/10.1 |

FOREIGN PATENT DOCUMENTS

| | | |
|---|---|---|
| DE | 10 2009 041 483 A1 | 3/2011 |
| JP | 5079806 A | 3/1993 |
| WO | WO 03 105324 A1 | 12/2003 |
| WO | WO 2007 033888 A1 | 3/2007 |

OTHER PUBLICATIONS

Permittivität—Wikipedia http://de.wikipedia.org/wiki/Permittivität printed on Sep. 9, 2011; pp. 1-8; Others; 2011.

* cited by examiner

Primary Examiner — Tung X Nguyen
Assistant Examiner — Son Le
(74) Attorney, Agent, or Firm — Henry M. Feiereisen LLC

(57) ABSTRACT

An electric machine includes a first active part, which has a plurality of active part segments disposed one behind the other in a direction of movement of the electric machine, with each of the active part segments including a position measuring device, and a second active part with a measuring device for identifying the respective position measuring device. Each position measuring device has at least one position measuring unit having a dielectric constant, wherein the dielectric constant of the position measuring unit in one of the active part segments is different than the dielectric constant in an adjacent one of the active part segments. The measuring device includes at least one measuring unit to determine the dielectric constant of the position measuring units.

8 Claims, 3 Drawing Sheets

ELECTRIC MACHINE

CROSS-REFERENCES TO RELATED APPLICATIONS

This application claims the priority of European Patent Application, Serial No. EP 11 180 855, filed Sep. 12, 2011, pursuant to 35 U.S.C. 119(a)-(d), the content of which is incorporated herein by reference in its entirety as if fully set forth herein.

BACKGROUND OF THE INVENTION

The present invention relates to an electric machine and to a method for determining a position of a first active part of an electric machine relative to a second active part of the electric machine.

The following discussion of related art is provided to assist the reader in understanding the advantages of the invention, and is not to be construed as an admission that this related art is prior art to this invention.

In electric machines a first active part can usually be moved relative to a second active part. The exact determination of the position of the first active part relative to the second active part is of particular importance both in rotary electric machines and in linear motors. Firstly, in electric machines embodied as three-phase servo motors, if the position of the first active part relative to the second active part is precisely known the magnetic field of the electric machine can be adjusted particularly effectively such that as little total current as possible is required to generate a desired torque or advance force.

In electric machines embodied as a linear motor, a precise knowledge of the position of a primary part relative to a secondary part is necessary in order to permit an effective linear motion of the motor. Such linear motors or linear drives are normally used in machine tools or in production systems. Here too, very exact position control is normally also required.

It would be desirable and advantageous to obviate prior art shortcomings and to enable a determination of a position of a first active part of an electric machine relative to a second active part of the electric machine in a particularly effective manner.

SUMMARY OF THE INVENTION

According to one aspect of the present invention, an electric machine includes a first active part having a plurality of active part segments which are disposed one behind the other in a direction of movement of the electric machine, a plurality of position measuring devices respectively provided in the active part segments, each position measuring device including at least one position measuring unit having a dielectric constant, wherein the dielectric constant of the position measuring unit in one of the active part segments is different than the dielectric constant in an adjacent one of the active part segments, and a second active part having a measuring device for identifying the position measuring devices, said measuring device including at least one measuring unit to determine the dielectric constant of the position measuring units.

According to the invention, the first active part of the electric machine has, in each active part segment, a corresponding position measuring device in which at least one position measuring unit is disposed. The respective position measuring unit can be formed from a corresponding material which has a defined dielectric constant or permittivity (http://de.wikipedia.org/wiki/permittivity). The second active part of the electric machine has a measuring device with at least one measuring unit, with which the dielectric constants of the respective position measuring units can be determined. For this purpose the measuring unit can contain at least one sensor device, which in turn is for example embodied as a capacitive sensor. Such capacitive sensors typically contain two electrodes, the capacitance between these two electrodes being influenced by the media located in the surrounding area; in the case of a body located in the vicinity with a high dielectric constant this capacitance is greater than in the case of a body of the same shape and size with a smaller dielectric constant located in its place at the same location. Such a measuring unit has the advantage that it can very easily be used to determine the dielectric constant of the position measuring unit contactlessly by determining the electrical capacitance. Furthermore, the measuring device is simple in construction and does not affect the functionality of the electric machine.

According to another advantageous feature of the present invention, the measuring device can have at least two of measuring units disposed in spaced-apart relationship in the direction of movement of the electric machine such that for each position of the first active part relative to the second active part at least one of the measuring units is positioned over one of the position measuring devices at any given time. This arrangement of the measuring units ensures that regardless of the position of the first active part of the electric machine relative to the second active part of the electric machine one of the position measuring devices can always be identified using one of the two measuring units.

According to another advantageous feature of the present invention, each position measuring device can include at least two of position measuring units disposed at a same height when viewed in the direction of movement of the electric machine, wherein at least one measuring unit has at least two sensor devices, with the position measuring units assigned to the sensor device, respectively. Normally each position measuring device has a plurality of position measuring units, it being possible for the materials of the respective position measuring units to have different dielectric constants. Thus by using different position measuring units with different dielectric constants and/or by disposing the position measuring units in the position measuring device a corresponding encoding is enabled. Each measuring unit advantageously includes for each of the position measuring units of a position measuring device a separate sensor device, with which the dielectric constant of the respective position measuring unit can be determined. The individual sensor devices are advantageously positioned such that when positioning the measuring unit over the position measuring device they are located directly over the respective position measuring units. Thus the position of the first active part of the electric machine relative to the second active part of the electric machine can be determined particularly easily. For this purpose the measuring device can for example comprise a corresponding data memory, in which the encoding of the respective position measuring device is stored together with corresponding position information.

When using two distinguishable position measuring units, each with different dielectric constants, the respective sensor device can be designed as a capacitive sensor such that it generates a logical zero at its output if it is located over a position measuring unit with the first dielectric constant and emits a logical one if it is located over a position measuring unit with the second dielectric constant. This type of capacitive sensor is called a capacitive proximity switch. In this way the position measuring device over which the measuring device is currently located can be identified particularly easily.

According to another advantageous feature of the present invention, the first active part can have a periodic structure of grooves separated from one another by teeth. The position measuring devices are here advantageously disposed in the grooves of the first active part of the electric machine. Likewise it is conceivable that the position measuring devices are positioned on the teeth of the first active part of the electric machine. Thanks to the periodic structure of the first active part the position measuring devices are each spaced apart equally from one another. This periodic structure can also be used to determine the position of the first active part relative to the second active part.

According to another advantageous feature of the present invention, the measuring device includes a first incremental measuring device for determining the position of the first active part relative to the second active part. The incremental measuring device can be embodied in accordance with the gear wheel encoder principle or in the manner of a reluctance resolver. Such an incremental measuring device is described by way of example in US 2011/0221570 (under the designation "incremental measurement system"), to which reference is made herewith. By using such an incremental measurement device, a more precise determination of the position of the first active part relative to the second active part can be enabled.

According to another advantageous feature of the present invention, the first incremental measuring device may include at least two incremental measuring units which are embodied as capacitive sensors with analog output signals and disposed in spaced-apart relationship by a quarter of a length of an active part segment in the direction of movement of the electric machine. The length of the active part segment corresponds to the distance from the center of one tooth to the center of the adjacent tooth in the direction of movement of the electric machine. The teeth are here made from an electrically highly conductive material, for example iron, which in respect of a capacitive sensor behaves like a material with a high dielectric constant, while the grooves are filled with air or a setting compound with a low dielectric constant. Thanks to this arrangement of the two incremental measuring units an essentially sinusoidal output signal can be generated by the incremental measuring units each time the first active part moves relative to the second active part, the signals of the two incremental measuring units being offset against one another by 90°. These signals can be evaluated using a corresponding sine/cosine sensor evaluation. To improve the sinusoidal shape of the output signals of the incremental measuring units, corresponding materials with a dielectric constant can be used in the grooves which have a location-dependent expansion transversely to the direction of movement of the electric machine. This location dependency can be selectively adjusted to improve the sinusoidal shape. Thus the distance of the measuring device from one of the teeth can be determined particularly accurately.

To prevent any mutual interference between the sensor signals of the respective sensor device of a measuring unit which are disposed close to one another, the measurement of the individual sensor devices can for example be offset in time. Likewise it is conceivable that the individual sensor devices are each operated with a different frequency, so that no electromagnetic crosstalk between the individual sensor devices occurs and thus the respective position measuring devices can be identified particularly accurately.

According to another advantageous feature of the present invention, each position measuring device includes a plurality of incremental position units which are disposed one behind the other in the direction of movement of the electric machine. The measuring device may include a second incremental measuring device which has several capacitive sensors. To be able to determine the position of the first active part of the electric machine relative to the second active part of the electric machine even more exactly, a plurality of incremental position units can be disposed in each of the position measuring devices. The respective incremental position units have a pre-established dielectric constant. Advantageously the materials of the respective incremental position units have two different dielectric constants, the incremental position units being alternately disposed in the direction of movement of the electric machine. Thus with the help of the second incremental measuring device the relative position of the measuring device within an active part segment can be determined particularly accurately.

The electric machine is advantageously embodied as a linear motor having a primary part which can be formed as the second active part and a secondary part which can be formed by the first active part. Thus thanks to the corresponding position measuring devices in the secondary part of the linear motor and the measuring device which is disposed in the primary part of the linear motor, the position of the secondary part relative to the primary part can be determined particularly easily.

According to another aspect of the present invention, a method for determining a position of a first active part of an electric machine relative to a second active part of the electric machine is provided, with the first active part including a plurality of active part segments which are disposed one behind the other in the direction of movement of the electric machine, with each of the active part segments having a position measuring device, and the second active part including a measuring device for identifying the respective position measuring devices, with each position measuring device having at least one position measuring unit, wherein the at least one position measuring unit has a first dielectric constant in one of the active part segments, and the at least one position measuring unit has a second dielectric, constant, different in comparison to the first dielectric constant, in a second active part segment adjacent to the first one, wherein the measuring device has at least one measuring unit with which the dielectric constant of the respective position measuring unit is determined.

The developments described here in connection with the electric machine can likewise be transferred to the method for determining a position of a first active part of an electric machine relative to a second active part of the electric machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
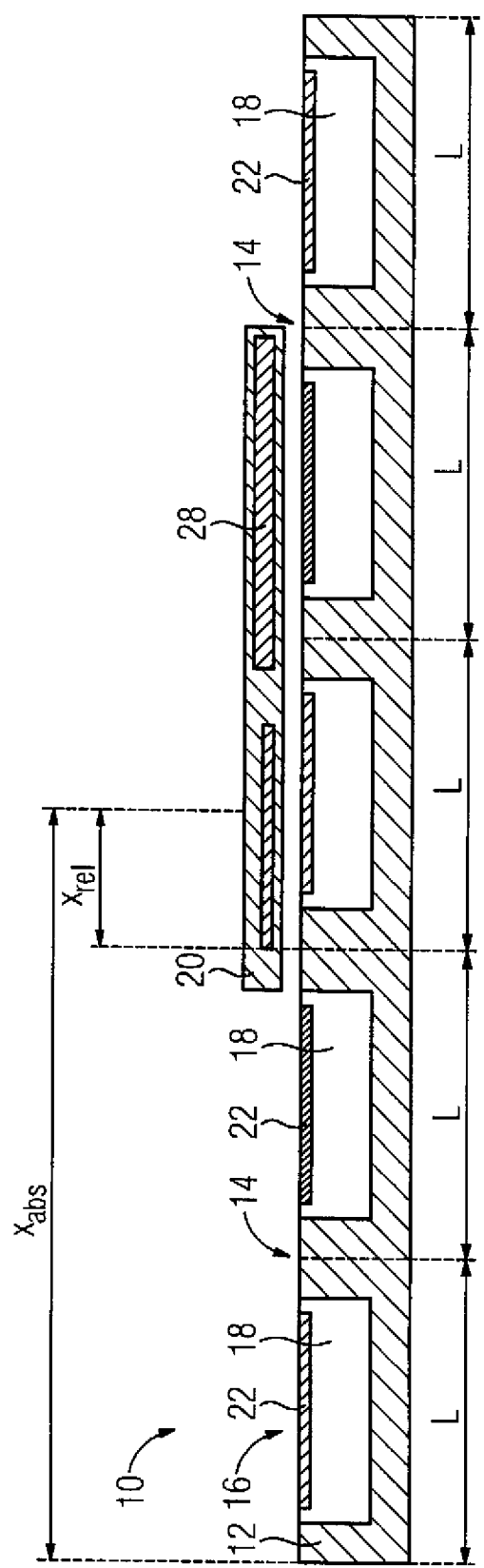
FIG. 1 shows a cut-away side view of a first active part of an electric machine and of a measuring device.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cut-away side view of a first active part 10 of an electric machine and of a measuring device 20. The electric machine is here embodied as a linear motor, the first active part 10 of the electric machine corresponding to a secondary part of the linear motor. The first active part 10 of the electric machine includes a plurality of active part segments 12 which are disposed one behind the other in the direction of movement of the electric machine. The first active part 10 is here embodied as a periodic structure of grooves 16 separated from one another by teeth 14. Each of the active part segments 12 includes a corresponding position measuring device 18. The position measuring device 18 is here disposed in the grooves 16 of the first active part 10 of the electric machine. Likewise it is conceivable that the position measuring devices 18 are disposed on the teeth 14. In this case the height of the position measuring devices 18 must not exceed the width of the air gap between the first active part 10 and the second active part.

The second active part of the electric machine or the primary part of the linear motor is not shown here. The second active part of the electric machine includes a measuring device 20 for identifying the respective position measuring device 18. Each position measuring device 18 includes at least one position measuring unit 22.

Figure 2:
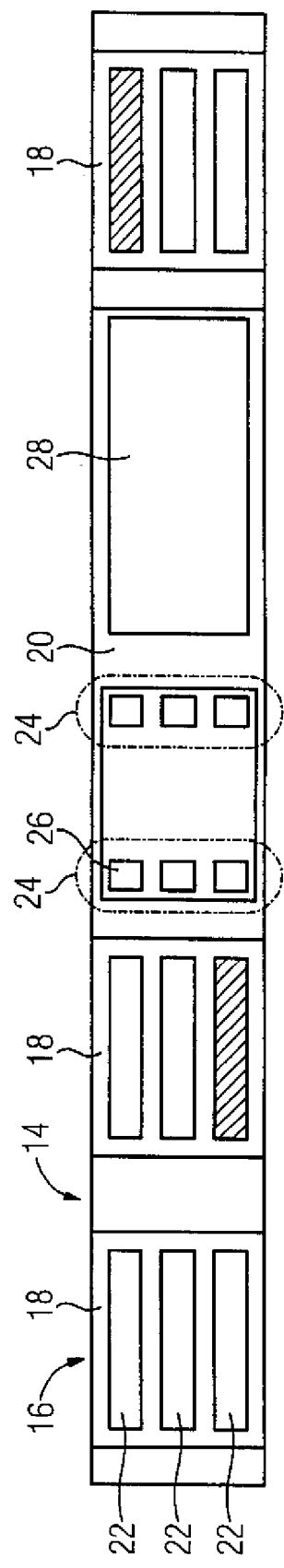
FIG. 2 shows a plan view of a first active part of an electric machine, in which a measuring device is illustrated.
Figure 3:
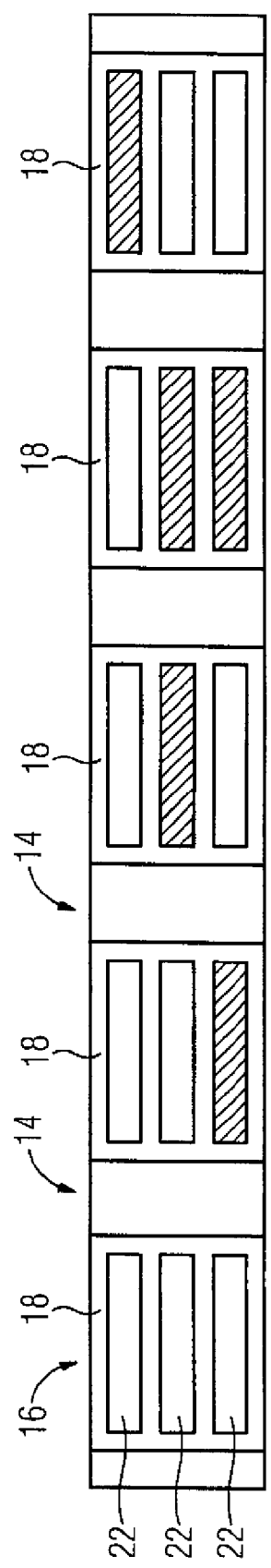
FIG. 3 shows a plan view according to FIG. 2, in which the measuring device is not illustrated.

FIG. 2 shows a plan view of the first active part 10 of the electric machine according to FIG. 1. Here each position measuring device 18 includes three position measuring units 22, which are disposed at the same height when viewed in the direction of movement of the electric machine. One of the position measuring units 22 is here manufactured from a first material which has a first dielectric constant and a second position measuring device is manufactured from a second material which has a second dielectric constant. The position measuring units 22 manufactured from the material that has a second dielectric constant are shown hatched in the present figures.

Thanks to the arrangement of the position measuring units 22 in the position measuring device 18 a corresponding encoding can be enabled. By using three position measuring units 22 in a position measuring device 18 which have two different materials with two different dielectric constants, eight possible arrangements of the position measuring units 22 can be achieved. It is likewise conceivable here for a plurality of position measuring units 22 to be provided in the position measuring device 18. Furthermore, a plurality of different materials can be used for the respective position measuring units 22, each of which has different dielectric constants.

The measuring device 20 includes at least two measuring units 24 which are disposed offset in the direction of movement of the electric machine. By using two measuring units 24 disposed offset against one another in the direction of movement of the electric machine it can be guaranteed that one measuring unit 24 is always located over a position measuring device 18. The measuring unit 24 here includes three sensor devices 26 which are disposed at the same height when viewed in the direction of movement of the electric machine.

The sensor devices 26 are here positioned such that when the first active part of the electric machine moves relative to the second active part of the electric machine they are placed over the corresponding position measuring unit 22. The respective sensor units 26 are for example embodied as capacitive proximity switches, in order to be able to identify the respective dielectric constant of the position measuring devices 22. Thus the corresponding arrangement of the position measuring units 22 and the respective dielectric constants of the position measuring units 22 can be determined using one of the measuring units 24.

Furthermore the measuring device 20 can include a memory element (not shown here) which stores the encoding of the respective position measuring device 18 together with corresponding position information. Thus it is particularly easy to determine over which of the position measuring devices 18 the measuring device 20 is currently located. Furthermore, the measuring device 20 includes a corresponding sensor element 28 with which a relative position $x_{rel}$ can be determined. For this purpose the sensor element 28 can for example be embodied as a reluctance resolver or as a Hall sensor. Using the measuring unit 24 it is possible to determine over which position measuring devices 18 the measuring unit 20 and thus the second active part of the electric machine is currently located. Together with the relative position $x_{rel}$ the absolute position $X_{abs}$ can be determined.

Figure 4:
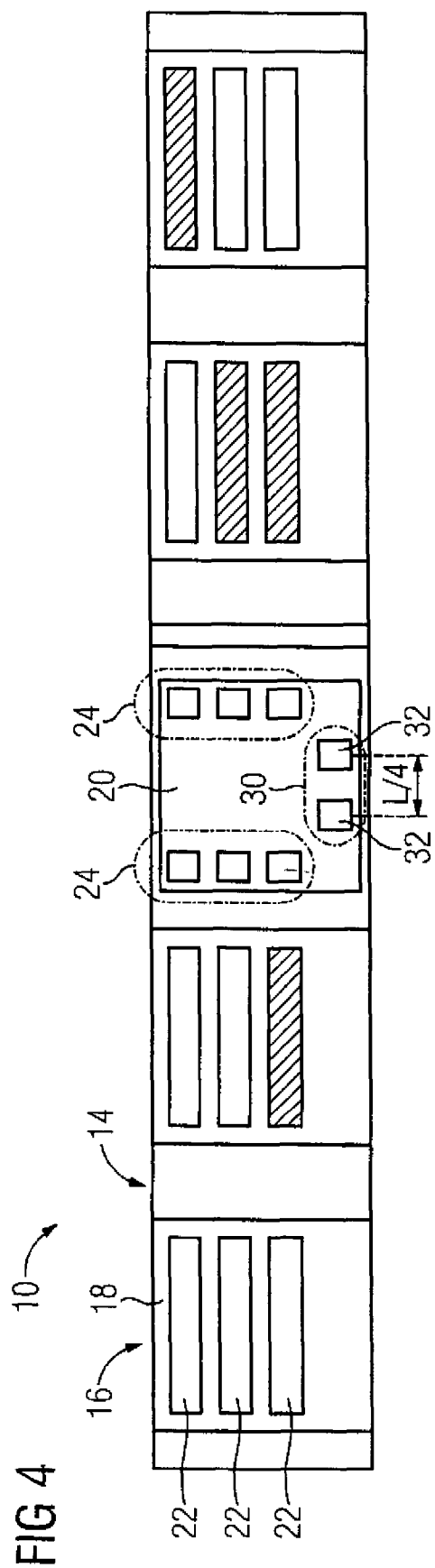
FIG. 4 shows a plan view according to FIG. 2, in which a first incremental measuring device is illustrated.

FIG. 4 shows a plan view of a first active part 10 of an electric machine according to FIG. 2. The measuring device 20 here includes, instead of the sensor element 28, a first incremental measuring device 30. The first incremental measuring device here includes two incremental measuring units 32 which are disposed offset against one another in the direction of movement of the electric machine. The incremental measuring units 32 can likewise be embodied as capacitive sensors. Advantageously the two incremental measuring units 32 are spaced a quarter of a length L of an active part segment 12 apart from one another in the direction of movement of the electric machine. Thus when the measuring device 20 moves along the first active part 10 of the electric machine a sinusoidal output signal is produced in each case. The sinusoidal output signals of the two incremental measuring units 32 are here offset by 90° against one another. Thus using the first incremental measuring device 30 the relative position $x_{rel}$ can be determined.

Figure 5:
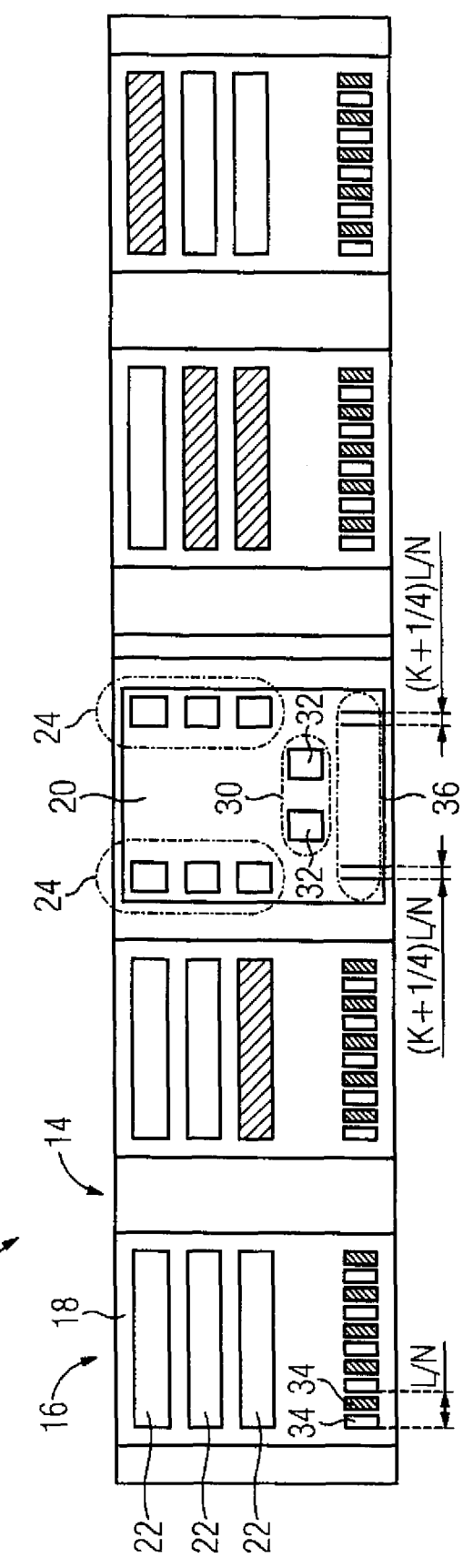
FIG. 5 shows a plan view according to FIG. 4, in which a first incremental measuring device, a second incremental measuring device and associated incremental position units are illustrated.

FIG. 5 shows a plan view of the first active part 10 of an electric machine according to FIG. 4. Each position measuring device 18 here includes a plurality of incremental position units 34 which are disposed one behind the other in the direction of movement of the electric machine. The respective incremental position units 34 have different dielectric constants. Advantageously the incremental position units 34 have two distinguishable dielectric constants, the incremental position units 34 with different dielectric constants being alternately disposed in the direction of movement of the electric machine.

The measuring device 20 has a second incremental measuring device 36. The incremental position units 34 are here disposed periodically, the period length being L/N (where N=2, 3, 4 . . . ). The second incremental measuring device 36 here includes two pairs of capacitive individual sensors spaced apart from one another in the direction of movement of the electric machine. The two capacitive individual sensors of such a pair are spaced apart from one another by $(K+¼)·L/N$ (where K=0, 1, 2, . . . N). In the example illustrated in FIG. 5, N=8 and K=0.

Thus essentially sinusoidal signals are produced at the outputs of the capacitive individual sensors of such a pair, and are offset against one another by 90°. Two pairs of capacitive individual sensors are used here, it thereby being ensured that one of the two pairs of sensors is always located over one or more of the incremental position units 34.

Using the measuring device 20, the first incremental measuring device 30 and the second incremental measuring device 36 the absolute position $X_{abs}$ of the first active part of the electric machine relative to the second active part of the electric machine can be determined particularly effectively and accurately.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalent of the elements recited therein:

1. An electric machine, comprising:
    a first active part having a plurality of active part segments which are disposed one behind the other in a direction of movement of the electric machine;
    a plurality of position measuring devices respectively provided in the active part segments, each position measuring device including at least one position measuring unit having a dielectric constant, wherein the dielectric constant of the position measuring unit in one of the active part segments is different than the dielectric constant in an adjacent one of the active part segments; and
    a second active part having a measuring device for identifying the position measuring devices, said measuring device including at least one measuring unit to determine the dielectric constant of the position measuring units.

2. The electric machine of claim 1, wherein the measuring device comprises at least two of said measuring unit disposed in spaced-apart relationship in the direction of movement of the electric machine such that for each position of the first active part relative to the second active part at least one of the measuring units is positioned over one of the position measuring devices at any given time.

3. The electric machine of claim 1, wherein each position measuring device comprises at least two of said position measuring unit disposed at a same height when viewed in the direction of movement of the electric machine, and said at least one measuring unit comprising at least two sensor devices, with the position measuring units assigned to the sensor devices into one-to-one correspondence.

4. The electric machine of claim 1, wherein the first active part has a periodic structure of grooves separated from one another by teeth.

5. The electric machine of claim 1, wherein the measuring device comprises a first incremental measuring device for determining a position of the first active part relative to the second active part.

6. The electric machine of claim 5, wherein the first incremental measuring device comprises at least two incremental measuring units which are embodied as capacitive sensors and disposed in spaced-apart relationship by a quarter of a length of an active part segment in the direction of movement of the electric machine.

7. The electric machine of claim 1, wherein each position measuring device comprises a plurality of incremental position units which are disposed one behind the other in the direction of movement of the electric machine, and wherein the measuring device comprises a second incremental measuring device.

8. The electric machine of claim 1, constructed in the form of a linear motor, said second active part forming a primary part of the linear motor, and said first active part forming a secondary part of the linear motor.

* * * * *